United States Patent
Ron et al.

(10) Patent No.: US 10,798,742 B2
(45) Date of Patent: Oct. 6, 2020

(54) SENSING METHODS FOR WIRELESS COMMUNICATION DEVICES

(71) Applicant: JRD COMMUNICATION INC., Shenzhen, Guangdong (CN)

(72) Inventors: Roy Ron, Guangdong (CN); Michal Palgy, Guangdong (CN); Benny Assouline, Guangdong (CN)

(73) Assignee: JRD COMMUNICATION INC., Shenzhen, Guangdong (CN)

( * ) Notice: Subject to any disclaimer, the term of this patent is extended or adjusted under 35 U.S.C. 154(b) by 0 days.

(21) Appl. No.: 16/670,541

(22) Filed: Oct. 31, 2019

(65) Prior Publication Data

US 2020/0068615 A1 Feb. 27, 2020

Related U.S. Application Data

(63) Continuation of application No. 16/082,530, filed as application No. PCT/CN2017/084152 on May 12, 2017, now Pat. No. 10,499,433.

(30) Foreign Application Priority Data

Sep. 29, 2016 (GB) .................................. 1616589.6

(51) Int. Cl.
*H04W 74/08* (2009.01)
*H04W 76/14* (2018.01)
(Continued)

(52) U.S. Cl.
CPC ..... *H04W 74/0816* (2013.01); *H04L 27/2607* (2013.01); *H04W 72/02* (2013.01); *H04W 72/0446* (2013.01); *H04W 76/14* (2018.02)

(58) Field of Classification Search
CPC ............ H04W 74/0816; H04W 72/02; H04W 72/0446; H04W 76/14; H04W 76/23; H04W 74/0808; H04L 27/2607
See application file for complete search history.

(56) References Cited

U.S. PATENT DOCUMENTS

| | | | |
|---|---|---|---|
| 2015/0264662 A1 | 9/2015 | Sahlin et al. | |
| 2019/0037495 A1 | 1/2019 | Wilson et al. | |
| 2020/0037358 A1* | 1/2020 | Chae ................. | H04W 74/0808 |

FOREIGN PATENT DOCUMENTS

| | | |
|---|---|---|
| CN | 104812058 A | 7/2015 |
| CN | 105246025 A | 1/2016 |
| CN | 105681439 A | 6/2016 |

* cited by examiner

*Primary Examiner* — Curtis A Alia
(74) *Attorney, Agent, or Firm* — Baker Hostetler LLP

(57) ABSTRACT

A pedestrian-located UE monitors selected subframes of a sidelink resource to detect periodic transmissions from other mobile devices to assist it in selecting a free resource for its own sidelink transmissions. The subframe selection is based on a cost metric which takes into account a probability of missing detection of a transmission with periodicity p from another mobile device, an average number of transmissions with periodicity p that are expected from another mobile device within a predefined transmission period of the mobile device, and a number of transmission cycles of the mobile device that need to occur in order to have a single potential collision with each periodic transmission from said at least one other wireless communication. The method provides a trade-off between avoiding future collisions and battery life.

12 Claims, 1 Drawing Sheet

(51) Int. Cl.
*H04L 27/26* (2006.01)
*H04W 72/02* (2009.01)
*H04W 72/04* (2009.01)

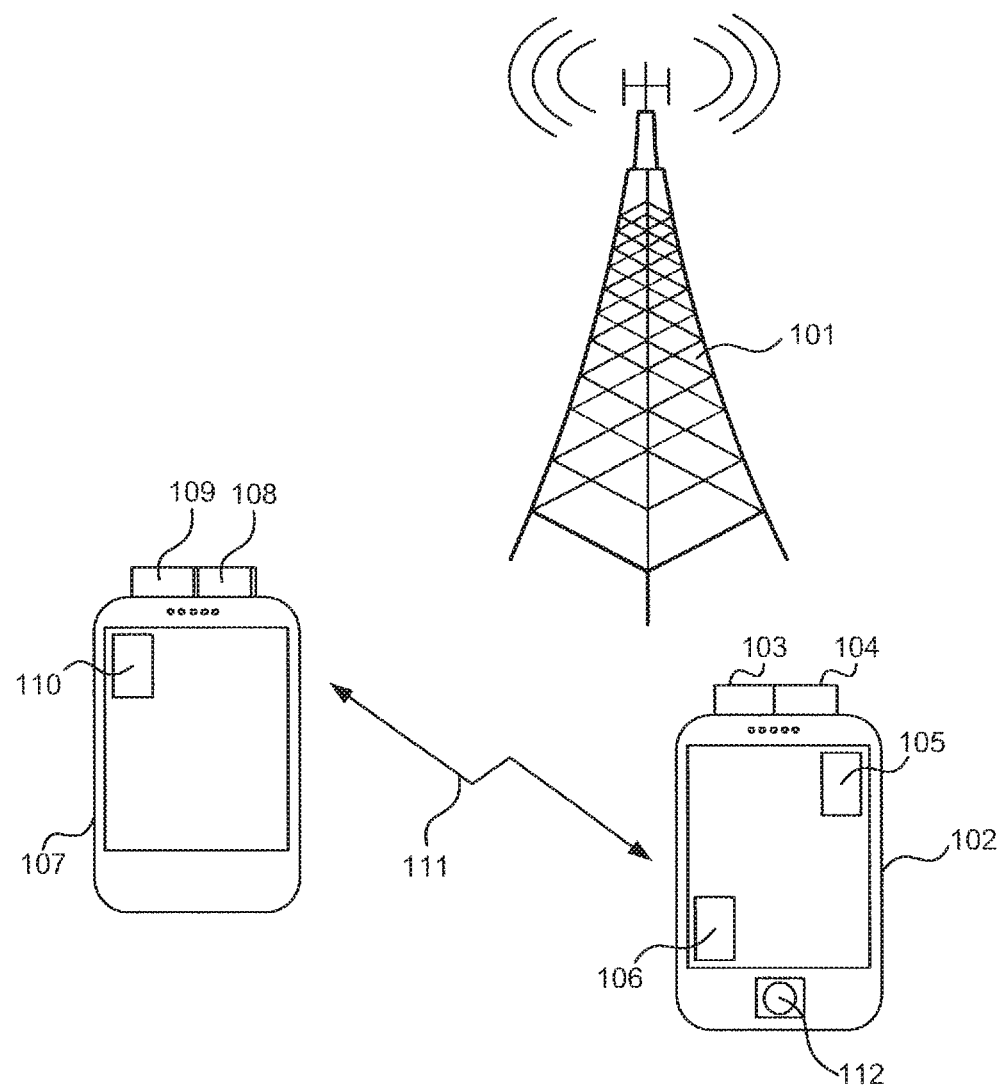

SENSING METHODS FOR WIRELESS COMMUNICATION DEVICES

CROSS-REFERENCE TO RELATED APPLICATIONS

This application is a Continuation of U.S. application Ser. No. 16/082,530, filed Sep. 5, 2018, which claims priority to National Stage International patent application PCT/CN2017/084152, filed May 12, 2017, which claims priority to Great Britain patent application no. GB 1616589.6, filed on Sep. 29, 2016, the disclosures of which are incorporated by reference herein in their entirety.

TECHNICAL FIELD

Embodiments of the present invention generally relate to sensing operations that a wireless communication device may perform when needing to select a resource, particularly on the PC5 interface.

BACKGROUND

The PC5 interface facilitates a direct link (on a so-called 'sidelink') between UEs (User Equipments). A PC5 resource pool may be used by a P-UE (Pedestrian User Equipment) and shared with V-UEs (Vehicle User Equipment) or I-UE (Infrastructure User Equipment). Herein, the term V2X means LTE-based (Long Term Evolution) communications services connecting vehicles, pedestrians and infrastructures: P2V refers to LTE-based communication between a device carried by an individual, such as a pedestrian, and a vehicle. V2V refers to LTE-based communication between vehicles: V2P refers to LTE-based communication between a vehicle and a device carried by an individual: V2I refers to LTE-based communication between a vehicle and a roadside unit. A roadside unit may be implemented in an eNB or static UE (User Equipment).

One current proposal under consideration for P2V transmissions is 'random resource selection.' This minimizes power consumption for PC5-based V2X services and does not require the P-UE to receive on a PC5 carrier. Also, random resource selection is able to meet the requirement of V2X services including the packet reception ratio (PRR) performance requirement. A proposal under consideration for V2X resource selection is a sensing operation which is performed during a limited time. This involves energy measurements or SA (Scheduling Assignment) decoding. Due to better selection of resources and reduced resource collisions (compared with random resource selection), this can improve the PRR performance although with the penalty of additional power consumption and the need for UE reception on a PC5 carrier.

The sensing operation is performed in order to determine the available resources to be used. The sensing operation is currently defined for UEs which are mounted in vehicles and connected to (almost) unlimited power supply. The existing traffic model of V2X is re-used; one 300-byte message is followed by four 109-byte messages and transmission periodicities are k*100 ms where k=1, 2, 3, 4, 5, 6, 7, 8, 9, 10. The periodicity is determined by the speed of the vehicle in question; For example, a higher speed vehicle may transmit every 200 ms. A lower speed vehicle may transmit every 800 ms. For P2X, the message size is fixed at 300 bytes and the transmission periodicity is 1 s.

During a known sensing operation, a V-UE monitors (i.e. at least decodes) transmitted data from other UEs and derives from the content if and when each UE will use the same resource for future transmissions. That is to say that the UE reserves these resources for future use. This information is necessary so that the sensing operation can mitigate the resource collision problem when resources are selected autonomously. Collisions can occur because UEs select resources from a pre-defined pool of limited resource. A resource reservation is related to the transmission periodicity (of the V2X transmissions). For example; if a V2X UE is currently transmitting every 200 ms, then the V2X UE will reserve a resource for its next transmission 200 ms ahead. A current specification deems that V-UEs will perform sensing during a 'sensing window' of 1 s duration. In this case, sensing can cover all periodicities and therefore V-UEs can ultimately avoid of collisions when resources are selected or re-selected.

For V2P operations, a P-UE consumes considerable power because it needs to receive messages which may be generated as frequently as every 100 ms by vehicles in its proximity. On the other hand, a P2V transmission has the potential to consume less battery power because a P-UE needs to access the channel only once in every 1000 ms. However, the exact amount of battery consumption is dependent of the P-UE sensing behaviour: If a P-UE is required to sense the channel to identify which resources are occupied by the other UEs, P-UE power consumption will increase proportionally to the time duration of this sensing. It has been proposed that a P-UE performs a sensing operation during a limited time, i.e. less than one second. This would potentially reduce collisions compared with a random resource selection but take more battery power.

One known proposal is for sensing to be done on a periodic window of less than 100 ms (e.g. 10 ms) every 100 ms (i.e. 10 windows of 10 ms are equally spread over 1 second). In this way, a P-UE can perform sensing for a reduced time but, since it is done with 100 ms periodicity, it can capture all transmissions with all periodicities whose future transmissions could fall into the P-UE's target window for transmission. This method is attractive in that the sensing covers all transmissions with all periodicities. However, the power consumption is still relatively high.

It would be advantageous to provide a means for minimising the collision probability of V2P and P2V communications without a P-UE having to perform a comparatively long sensing operation that degrades the battery life.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a first aspect of the present invention there is provided a method for assisting cyclic transmissions from a wireless communication device during predefined target transmission windows on a sidelink communications resource comprising a plurality of subframes, the method comprising; sensing periodic transmissions of periodicity p from at least one other wireless communication device on the sidelink communications resource by monitoring subframes, SFs, contained in a variable number N of time windows of fixed duration, wherein the subframes for monitoring are defined as; SFs=n−J*p where an arrival time of a transport block occurs at subframe n.

Values of J may be transmitted to the wireless communication device from a base station Said time windows may precede a target transmission window by 400 ms, 600 ms, 800 ms and 1000 ms whereby J is represented by J=[4, 6, 8, 10].

Said time windows may precede a target transmission window by 200 ms, 600 ms, 800 ms and 1000 ms whereby J is represented by {2, 6, 8, 10}.

Said time windows precede a target transmission window by 600 ms, 800 ms and 1000 ms and where J is represented by J={6, 8, 10}.

Said time windows precede a target transmission window by 200 ms, 800 ms and 1000 ms and where J is represented by J={2, 8, 10}.

According to a second aspect of the present invention there is provided a method for assisting cyclic transmissions from a wireless communication device during predefined target transmission windows on a sidelink communications resource comprising a plurality of subframes, the method comprising; detecting periodic transmissions of periodicity p from at least one other wireless communication device on the sidelink communications resource by selecting at least one set of subframes, j, from the plurality of subframes for monitoring, the selecting being based on a cost metric Mj(p), where Mj(p)=P(p)*m(p)/H(p) and where P(p) is a probability of missing sensing a transmission with periodicity p from another wireless communication device, m(p) is an average number of transmissions with periodicity p that are expected from one other wireless communication device within a transmission period of the wireless communication device, and H(p) is a number of transmission cycles of the wireless communication device that need to occur in order to have a single potential collision with each periodic transmission from another wireless communication device.

The method can be applied to a wireless communication system which may be an LTE system and the sidelink may comprise a PC5 link. The wireless communication device may be a P-UE. Another wireless communication device may be a V-UE or an I-UE or another P-UE. Each UE may include a PC5 interface.

In one embodiment, the method further includes transmitting from a base station to the wireless communication device information identifying at least one set of subframes for selection. Information identifying a number of subframes in a set to be monitored may also be transmitted from a base station to the wireless communication device.

According to a third aspect of the present invention there is provided a wireless communication device arranged to: transmit cyclic transmissions during predefined target transmission windows on a sidelink communications resource comprising a plurality of subframes; and sense periodic transmissions of periodicity p from at least one other wireless communication device on the sidelink communications resource by selecting at least one set of subframes, j, from the plurality of subframes for monitoring, the selecting being based on a cost metric Mj(p), where Mj(p)=P(p)*m(p)/H(p) and where P(p) is a probability of missing sensing a transmission with periodicity p from said another wireless communication device, m(p) is an average number of transmissions with periodicity p that are expected from one other wireless communication device within a transmission period of the wireless communication device, and H(p) is a number of transmission cycles of the wireless communication device that need to occur in order to have a single potential collision with each periodic transmission from another wireless communication device.

In one embodiment, the selecting is further based on the sensing of periodic transmissions from another wireless communication.

In another embodiment, a set of subframes to be monitored are hard-coded into a specification for the wireless communication device, (Into a table, for example), According to a fourth aspect of the present invention there is provided a signal processor arranged to calculate a cost metric Mj(p), where Mj(p)=P(p)*m(p)/H(p) and where P(p) is a probability of missing sensing of a transmission with periodicity p from a transmitting wireless communication device, m(p) is an average number of transmissions with periodicity p that are expected from the transmitting wireless communication device within a transmission period of a receiving wireless communication device, and H(p) is a number of transmission cycles of the receiving wireless communication device that need to occur in order to have a single potential collision with each periodic transmission from the transmitting wireless communication device.

The invention enables a P-UE to perform a limited (in time) sensing operation in which a specific set(s) of subframes is chosen for that purpose. For example, only a few windows are selected instead of the 10 used in the known proposal mentioned above. The sets are chosen in such a way that the limited sensing operation produces almost similar performance compared with some known proposals and thus the degradation in the system performance is negligible. The gain of this invention is expressed by a much lower reception time (i.e. sensing duration) and thus reduces the power consumption.

According to a fifth aspect of the invention there is provided a method for assisting cyclic transmissions from a wireless communication device during predefined target transmission windows on a sidelink communications resource comprising a plurality of subframes, the method comprising; sensing periodic transmissions of periodicity p from at least one other wireless communication device on the sidelink communications resource by monitoring subframes, SFs, contained in a variable number, N, of time windows of fixed duration, wherein the subframes for monitoring are defined as; SFs=n−J*100+k+B where an arrival time of a transport block occurs at subframe n and k is defined as [a1, a2, a3 ... aT] where ai is an integer for every i and where T is a number of subframes to be monitored in each time window and B is an offset.

In one embodiment, a1=1; and ai is less than a(i+1) which is less than 100 for every i.

The monitored subframes in any time window may be contiguous or noncontiguous.

According to a sixth aspect of the invention there is provided a wireless communication device arranged to: transmit cyclic transmissions during predefined target transmission windows on a sidelink communications resource comprising a plurality of subframes, and to sense periodic transmissions of periodicity p from at least one other wireless communication device on the sidelink communications resource by monitoring subframes, SFs, contained in a variable number N of time windows of fixed duration, and including a memory for storing a definition of the subframes for monitoring, wherein said subframes for monitoring are defined as; SFs=n−J*100+k+B where an arrival time of a transport block occurs at subframe n and k is defined as [a1, a2, a3 ... aT] where ai is an integer for every i and where T is a number of subframes to be monitored in each time window and B is an offset.

According to another aspect of the invention, there is provided a method for assisting cyclic transmissions from a wireless communication device during predefined target transmission windows on a sidelink communications resource comprising a plurality of subframes, the method comprising; sensing periodic transmissions of periodicity p from at least one other wireless communication device on the sidelink communications resource by monitoring subframes contained in a selected number, w, out of N time windows of fixed duration which precede a target transmission window wherein N ranges from 1 to a maximum value Nmax and wherein w can have any value from 1 to Nmax−1.

According to a further aspect of the invention, there is provided a wireless communication device arranged to: transmit cyclic transmissions during predefined target transmission windows on a sidelink communications resource comprising a plurality of subframes, and to sense periodic transmissions of periodicity p from at least one other wireless communication device on the sidelink communications resource by monitoring subframes contained in a selected number, w, out of N time windows of fixed duration which precede a target transmission window wherein N ranges from 1 to a maximum value Nmax and wherein w can have any value from 1 to Nmax−1.

According to a further aspect of the invention, there is provided a non-transitory computer readable medium having computer readable instructions stored thereon for execution by a processor to perform the method according to the first and fourth aspects.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

FIG. 1 is a simplified block diagram of a part of a wireless communication system and operating in accordance with an example embodiment.

DETAILED DESCRIPTION OF THE PREFERRED EMBODIMENTS

Those skilled in the art will recognise and appreciate that the specifics of the examples described are merely illustrative of some embodiments and that the teachings set forth herein are applicable in a variety of alternative settings.

Referring now to FIG. 1, an example of part of an LTE cellular communication system operating in accordance with embodiments of the invention is illustrated and indicated generally at 100 and comprises an evolved Node B (eNB) 101 which supports an LTE cell. There may be other eNBs (not shown) forming part of the communication system and supporting other associated cells. The eNBs may be connected to other conventional network components (not shown). The eNB 101 may communicate with one or more User Equipments (UEs) and may allocate resources for use by User Equipments for direct communications with each other. A first User Equipment 102 is located within the area of coverage of the eNB 101 and includes a receiver 103, a transmitter 104 and a signal processing circuit 105 for calculating a cost metric as described below. The User Equipment 102 also includes a PC5 interface 106. The first User Equipment 102 Is carried by a pedestrian and will be referred to hereafter as the P-UE. A second UE 107 is located in a vehicle and will be referred to hereafter as the V-UE 107. The V-UE is moving with variable speed and may move within the coverage area of the eNB 101. The V-UE 107 is provided with a transmitter 108, receiver 109, and a PC5 interface 110. The P-UE 102 and the V-UE 107 may communicate with each other directly over a side link 111 and with other similar UEs (not shown) in the vicinity. The P-UE 102 is provided with a memory 112. There may be other V-UEs and/or P-UEs (not shown) which may transmit/receive on a sidelink resource.

Direct communications between two UEs and in particular in this example between P-UE 102 and V-UE 107 via the side link 111 are based on two physical channels: The PSSCH (Physical Sidelink Shared Channel) carries actual transport channel data; and the PSCCH (Physical Sidelink Control Channel) carries control information that enables receiving UE to detect and decode data. The LTE communication system 100 supports V2X services and the V-UE 107 transmits V2V and V2P messages with a periodicity dependent on its road speed. Typically, the V-UE 107 transmits one 300 byte message followed by four 190 byte messages with periodicities ranging from 100 ms to 1 second depending on road speed. The crash avoidance metrics partnership has suggested that vehicles travelling at around 60 km/h should transmit every 300 ms whereas vehicles travelling at slower speeds of around 15 km/h can transmit every 1000 ms. It has been agreed that transmission periodicities will range from 100 ms to 1000 ms with 100 ms gaps for autonomous resource selection, The P-UE 102, travelling at walking speeds, may transmit P2V messages typically every 1000 ms. The message size is fixed at 300 bytes.

In accordance with a first example of a method of operation, the P-UE 102 needs to select resources for transmission on the sidelink and in order to do this, caries out a sensing operation. In the sensing operation, the P-UE monitors the sidelink 111 in order to detect resources which are already in use and therefore not necessarily available for its own use. The P-UE 102 periodically monitors the sidelink by monitoring subframes contained in one or more time windows over a sensing period (of typically 1 second) that precedes a P-UE transmission target window. A time window is 10 ms long in this example. The maximum monitoring periodicity is 100 ms in this example. A time window can be identified by an offset value from the target window in which the P-UE wishes to transmit. In this example, an identification of the particular set of subframes to be monitored is transmitted to the P-UE 102 (or broadcast) by the eNB 101 and is a part of the cell configuration i.e. the eNB 101 configures the P-UE 102 with this identification. In another example, to be described in more detail below, the identification of the particular subframes is fixed in the specifications, i.e. permanently configured into a UE. In a further example, also to be described in more detail below, the P-UE 102 performs an active part in selecting the particular subframes to monitor.

In this example, the transmission periodicity of the P-UE 102 is 1 s. It is also assumed that resources are to be used in a periodic manner.

Consider a sensing period of 1 s and a target window of 100 ms, in which the transmission (after the sensing) should occur. During the sensing period duration of 1 s, several transmissions in the vicinity of the UE may occur. These messages may be transmitted with various periodicities, e.g. 100, 200, 300 . . . 1000 ms, and each message indicates whether a subsequent transmission is planned to occur. A UE which performs that sensing, in order to select a resource within its target window, can easily predict whether each transmission will potentially collide with that resource or any of its future occurrences. The UE only needs to project the occupied resources it has sensed, during the sensing period (of 1 s), using its periodicity to all of its future occurrences. However, it is preferable to avoid sensing periods as long as 1 s because of the power consumption involved.

Consider now the use of a shorter sensing duration, within a window of 100 ms which starts 100 ms before the target window for transmission. This means that the UE will be able to predict all the occupied resources that are sent with a periodicity of 100 ms and avoid collisions with them. The benefit of using a shorter sensing time is that the consumed power by the sensing operation is reduced by a factor of 10. However, if it is assumed that the transmissions are equally spread over 1 s, then it can be said that 90% of the transmissions will not be sensed. So if some transmissions are sent with a periodicity other than 100 ms then the collisions rate will increase and the overall system performance will be poor (similar to random selection).

However, not all transmission periodicities of [100, 200 . . . 1000] ms are of equal significance for the sensing operation. For example, If V-UE107 transmits with a periodicity of 700 ms and its transmission collides with a transmission from P-UE 102, this collision will only re-occur every 7 sec (i.e. every 7th transmission of the P-UE 102 will collide with the transmission of V-UE 107). On the other hand, if V-UE 107 transmits with a periodicity of 500 ms then such a transmission will collide with the P-UE 102 transmissions and re-occur every 1 sec (i.e. every transmission of the P-UE 102 will again collide with the transmission of V-UE 107) Therefore one can conclude that e.g. a 500 ms periodicity is more significant than the 700 ms one, when considering resource collisions. In general, a "Hit cycle" can be defined for any transmission periodicity which is the number of P-UE 102 transmission cycles (of 1s) that need to occur in order to have a single (potentially) collision with each periodic transmission from V-UE107 (or from any other V-UE, P-UE or I-UE). This is illustrated in the following table.

|  | Transmission periodicity (ms) | | | | | | | | | |
| --- | --- | --- | --- | --- | --- | --- | --- | --- | --- | --- |
|  | 1000 | 900 | 800 | 700 | 600 | 500 | 400 | 300 | 200 | 100 |
| hitCycles (p) | 1 | 9 | 4 | 7 | 3 | 1 | 2 | 3 | 1 | 1 |

For any set of chosen subframes of a sidelink resource which are to be sensed, a metric can be found that quantifies the cost of using that particular chosen set. For the example, say a single set of (contiguous) subframes are chosen that lie in a fifth time window (of 10 ms) i.e. that is offset from the start of a target window by 500 ms. In this example, there are ten time windows of 10 ms which are offset consecutively at 100 ms intervals from the start of the target transmission window. A probability that transmissions with certain periodicities will not be sensed can be calculated.

For 100 ms periodicity transmissions and disregarding re-selection, all transmissions will be sensed since all of them will fall within the fifth window as well as in all other windows. For 200 ms periodicity transmission, those that fall on the odd windows (i.e. 1, 3, 5, 7 and 9) will not have the potential to collide in the target window but will be sensed. On the other hand, transmissions that fall in the even windows will have the potential to collide in the target window and none of these will be sensed. So generally speaking, this example statistically misses sensing half of the 200 ms transmissions. Similarly, for 300 ms periodicity transmissions, two thirds of these transmissions will be missed. However it could be that some of them will never collide with the target transmission since they will never fall into the target window or its future occurrence. In general, for a selected set of subframes, a probability (Pmiss(p)) of missing transmissions of a particular periodicity (p) which may collide with any occurrence of the target window can be calculated and is summarized in the table below (for this particular example given above):

|  | Periodicity (ms) | | | | | | | | | |
| --- | --- | --- | --- | --- | --- | --- | --- | --- | --- | --- |
|  | 1000 | 900 | 800 | 700 | 600 | 500 | 400 | 300 | 200 | 100 |
| Pmiss (p) | 0.1 | 0.8889 | 0.5 | 0.8571 | 0.5 | 0 | 0.5 | 0.6667 | 0.5 | 0 |

An average number of transmissions 'avgNumTxCycle' (from a single UE) which may be expected for a particular periodicity within a 1 s window is summarized in the table below:

| | Periodicity (ms) | | | | | | | | | |
|---|---|---|---|---|---|---|---|---|---|---|
| | 1000 | 900 | 800 | 700 | 600 | 500 | 400 | 300 | 200 | 100 |
| avgNumTxCycle (p) | 1 | 1.11 | 1.25 | 1.43 | 1.67 | 2 | 2.5 | 3.33 | 5 | 10 |

Finally, a metric is found that measures, for each periodicity, p, the cost of using a particular set, j, of subframes. This metric takes into account the probability as calculated above, the hit cycles and the expected number of transmissions for each periodicity. This metric can provide a good measure when trying to find the best sets of subframes to be sensed. As long as the cost is relatively low, the performance reduction compared to the full sensing (of 1 second duration) is kept low too.

This metric Mj(p) can be written as follows;

$$Mj(p) = Pmiss(p) * avgNumTxCycle(p)/hitCycles(p)$$

Mj(p) is the cost of a periodicity p for the set j; More specifically 100*Mj(p)/avgNumTxCycle(p) is the percentage of UEs with a transmission periodicity p that have the potential of colliding with the sensing P-UE within its target window. This gives a weighted cost with the number of transmissions.

A cost metric M for the set in the example given above is given in the following table.

| | Periodicity (ms) | | | | | | | | | |
|---|---|---|---|---|---|---|---|---|---|---|
| | 1000 | 900 | 800 | 700 | 600 | 500 | 400 | 300 | 200 | 100 |
| M | 0.1 | 0.1097 | 0.1563 | 0.1749 | 0.2778 | 0 | 0.625 | 0.7407 | 2.5 | 0 |

This set can be represented as j=[0 0 0 0 0 1 0 0 0 0] i.e. the subframes selected for monitoring lie in the fifth time window preceding the P-UE's target transmission window. So in this case, the total cost metric is the sum of the above values for M for each periodicity in the table above which is equal to 4.6844. This cost is relatively high but on the other hand battery requirements are low because subframes of only one time window are monitored.

As another example, subframes in all of the ten windows are monitored i.e. j=[1 1 1 1 1 1 1 1 1 1]. i.e. sensing occurs with a periodicity of 100 ms. This selection of subframes for monitoring is the best one in terms of system performance as all transmissions of all periodicities will be sensed and the total cost metric is equal to 0. However, this selection will lead to a relatively high battery consumption.

A metric can be found which trades off system performance against battery life.

In the above examples monitoring of subframes took place in one or ten windows where 10 was the maximum number. However, other window numbers (less than 10) may be chosen. Choosing fewer windows will reduce power consumption of the P-UE's battery by a factor of [10−N]/10 where N is the number of windows chosen. For instance, if N is chosen to be 4, there are in fact 210 different options for choosing 4 out of 10. One example for N=4 which has been found to give a relatively low-cost is defined by the set j=[1 0 1 0 1 0 1 0 0 0]. For this choice, all periodicities with the exception of 900 ms and 700 ms can be sensed but these periodicities will produce low-cost on the overall performance since the hit cycle of both periodicities is relatively high as can be seen in the table above.

If N is chosen to equal just 1, then a preferred option is to choose the window that is offset from the target window by 1000 ms. This window will cover the transmission periodicities from a V-UE of 100, 200, 500 and 1000 ms. However, it could be that a V-UE that transmits frequently (e.g. every 100 ms or 200 ms) will perform resource selection during the sensing period and thus the information derived from the sensing will not be relevant any more.

If N is chosen to equal 2, then a preferred option is to choose the set j=[1 0 1 0 0 0 0 0 0 0]. The window offset by 800 ms from the target window will cover the additional periodicity of 400 ms.

If N is chosen to equal 3, then a preferred option is to choose the set j=[1 0 1 0 1 0 0 0 0 0].

A preferred option for N chosen to equal 4 is that as described above i.e. j=[1 0 1 0 1 0 1 0 0 0]

If N is chosen to equal 5, then a preferred option is to choose the set j=[1 1 1 0 1 0 1 0 0 0].

The invention may be implemented in a wireless communication specification as follows. If the arrival time of a TB (Transport Block) is at subframe n and the UE is required to perform sensing, the UE should perform sensing on set of sub-frames (SFs) defined as follows:

$$SFs = n - \underline{J}*100 + k + B$$

k=[a1, a2, a3 . . . aT] where ai is an integer for every i, a1=1; and ai is less than a(i+1) which is less than 100 for every i. T is the length (in subframes) of the time window during which subframes are monitored. e.g. T=10.

B is an offset. B can be set depending on UE implementation but should preferably be limited in order to meet latency requirements J is the selected set of subframes as described above. For example, for a preferred choice of three out of ten windows, j=[1 0 1 0 1 0 0 0 0 0], or denoted another way; $\underline{J}$={10, 8, 6}.

This definition of the subframes SFs may be hard-coded into a wireless communication device (a P-UE for example). In the example of FIG. 1, this information is stored in the memory 112. Alternatively, it may be configured into the P-UE 102 by way of configuration information transmitted from the eNB 101.

It will be understood that the examples given above for selected subframes (values of j as a bitmap or $\underline{J}$ as indices) are not limiting and other values are contemplated. As an example, $\underline{J}$ may include the value 2, that is to say that sensing may be done in a time window which is offset from the target transmission window by 200 ms. Although in the examples given above the cost metric does not specify choosing this 200 ms window for sensing, using this window can have some advantages. Generally speaking, if sensing is performed in windows offset by 1000 ms, 800 ms and 600 ms, 100 ms transmission periodicities can be covered but this is true as long as the transmitting UE's does not perform resource reselection during the period from the end of the sensing to the transmission target window (600 ms). On the other hand, if one of the chosen windows is 200 ms then the period for reselection is only 200 ms, and then it can be said that the probability of re-selection during that shorter period is less probable. So sensing at the lower windows (e.g. within the 100 or 200 ms windows) is important in terms of performance. Generally, sensing in the 200 ms window covers the 100 ms transmission periodicities but the reverse does not hold true. A preferred set for N=4 can be defined as j=[1 0 1 0 1 0 0 0 1 0] J={2, 6, 8, 10}. A preferred set for N=3 is defined as j=[1 0 1 0 0 0 0 0 1 0] J={2, 8, 10}A preferred sets for N=5 is defined as j=[1 0 1 0 1 0 1 0 1 0] J={2, 4, 6, 8, 10}. A preferred set for N=6 is defined as j=[1 1 0 1 0 1 1 0 0].

In one embodiment the preferred set for N=5 above is hard-cored into the specification and a definition of the particular subframes to monitor is pre-configured stored into the memory 112 of the P-UE 102 or transmitted to the P-UE 102 by the eNB 101 and then stored in the memory 112. In this embodiment, if the arrival time of a TB (Transport Block) is at subframe n and the UE is required to perform partial sensing, the P-UE 102 should perform sensing on a set of sub-frames (SensedSFs) defined as follows:

$$SensedSFs = n - \underline{J}*100 + k + B$$

where;
k={1, 2, 3 . . . T}
T=10
$\underline{J}$={2, 4, 6, 8, 10}
B is an offset set depending on UE implementation but should preferably be limited in order to meet latency requirements In another example embodiment, the P-UE 102 selects the most suitable set of subframes to sense according to its own measurements. Therefore, a P-UE can change the selected set dynamically. For example, if the P-UE 102 has performed sensing on some predefined set of subframes (say the example mentioned above where $\underline{J}$=[10, 8, 6], and senses that most of the transmissions from V-UE 107 and other V-UE's (not shown) are being sent with a periodicity of 100 ms, then the P-UE 102 can choose to focus on sensing only on this periodicity and the signal processor 106 can calculate a revised set of subframes to monitor so that only transmissions of 100 ms periodicity are sensed. In this case, $\underline{J}$={1} i.e. j=[0 0 0 0 0 0 0 0 0 1] In order to assist the P-UE 102 to define a value for "most of" the transmissions, such a value may be signalled by the eNB 101. In this example, the eNB 101 sends a selection of possible sets of subframes (J values) for monitoring along with a value for T i.e. the length of a time window as a number of subframes (typically 10).

In other examples, a set of subframes to be monitored (j values) is configured in a P-UE by the eNB. The signal processor 107 in the P-UE then selects one set to use according to UE implementation. The parameter T (length of a time window in subframes) may also be configured in the P-UE by the eNB.

The signal processing functionality of the embodiments of the invention may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

The invention claimed is:

1. A method for selecting resources for cyclic transmissions from a wireless communication device during predefined target transmission windows on a sidelink communications resource comprising a plurality of subframes, the method comprising:
sensing periodic transmissions of periodicity p from at least one other wireless communication device on the sidelink communications resource by monitoring subframes, SFs, contained in a variable number N of time windows of fixed duration, wherein monitoring subframes includes:
decoding transmitted data from the at least one other wireless communication device; and
deriving, from the decoded data, if and when the at least one other wireless communication device will use a same resource for future transmissions,
wherein the subframes for monitoring are offsets of J*100 ms from the target transmission windows wherein J is a representation of a selected set of subframe numbers.

2. The method of claim 1 including transmitting from a base station to the wireless communication device values of J.

3. The method of claim 1 wherein N=4 and said time windows precede a target transmission window by 400 ms, 600 ms, 800 ms, and 1000 ms whereby J is represented by J=[4, 6, 8, 10].

4. The method of claim 1 wherein N=4 and said time windows precede a target transmission window by 200 ms, 600 ms, 800 ms, and 1000 ms whereby J is represented by {2, 6, 8, 10}.

5. The method of claim 1 wherein N=3 and said time windows precede a target transmission window by 600 ms, 800 ms, and 1000 ms and where J is represented by J={6, 8, 10}.

6. The method of claim 1 wherein N=3 and said time windows precede a target transmission window by 200 ms, 800 ms, and 1000 ms and where J is represented by J={2, 8, 10}.

7. A method for selecting resources for cyclic transmissions from a wireless communication device during predefined target transmission windows on a sidelink communications resource comprising a plurality of subframes, the method comprising:
sensing periodic transmissions of periodicity p from at least one other wireless communication device on the sidelink communications resource by monitoring subframes, SFs, contained in a variable number N of time windows of fixed duration, wherein monitoring subframes includes:
decoding transmitted data from the at least one other wireless communication device; and deriving, from the decoded data, if and when the at least one other wireless communication device will use the same resource for future transmissions, wherein the subframes for monitoring are defined as SFs=n−J*100+k+B where an arrival time of a transport block occurs at subframe n;

wherein J is a representation of a selected set of subframe numbers; and wherein k=[a1, a2, a3 . . . aT] where ai is an integer for every i, a1=1; and ai is less than a(i+1) which is less than 100 for every I and T is the length (in subframes) of the time window during which subframes are monitored, and wherein B is an offset which to meet latency requirements.

8. The method of claim 7 including transmitting from a base station to the wireless communication device values of J.

9. The method of claim 7 wherein N=4 and said time windows precede a target transmission window by 400 ms, 600 ms, 800 ms, and 1000 ms whereby J is represented by J=[4, 6, 8, 10].

10. The method of claim 7 wherein N=4 and said time windows precede a target transmission window by 200 ms, 600 ms, 800 ms, and 1000 ms whereby J is represented by {2, 6, 8, 10}.

11. The method of claim 7 wherein N=3 and said time windows precede a target transmission window by 600 ms, 800 ms, and 1000 ms and where J is represented by J={6, 8, 10}.

12. The method of claim 7 wherein N=3 and said time windows precede a target transmission window by 200 ms, 800 ms, and 1000 ms and where J is represented by J={2, 8, 10}.

* * * * *